United States Patent Office 2,750,428
Patented June 12, 1956

2,750,428
HYPNOTIC AGENTS

Abraham Bavley, Brooklyn, Morton Harfenist, Yonkers, and William M. McLamore, Flushing, N. Y., assignors to Chas. Pfizer & Co., Inc., Brooklyn, N. Y., a corporation of Delaware No Drawing. Application December 31, 1952,
Serial No. 329,088

9 Claims. (Cl. 260—633)

This invention is concerned with certain novel organic compounds which are active in inducing hypnosis in animals. It is also concerned with processes for the production of these materials.

Various agents have been recommended from time to time for use in inducing sedation or hypnosis in animals. Many of these materials suffer from one or more deficiencies. Certain of them require rather large doses to induce any appreciable degree of hypnosis. Others have undesirable side effects or after-effects. Some have an appreciable degree of toxicity and must be used with care. Certain members of the group induce on continued use a degree of dependence which approaches habituation.

We have found that certain halogen substituted vinyl ethinyl tertiary carbinols are effective hypnotic agents of a low degree of toxicity. The compounds of this invention may be designated by means of the following structural formula:

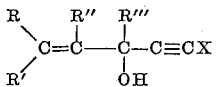

wherein R is hydrogen, methyl or ethyl, R' is hydrogen, methyl or ethyl, R" is hydrogen or methyl, R'" is an alkyl group having up to a total of about five carbons, and X is a halogen atom, preferably chlorine or bromine. The alkyl group (R'") may be straight or branched. The compounds are liquids or low-melting solids, colorless, and with characteristic odors.

The compounds of this invention are prepared by the halogenation of the corresponding vinyl ethinyl tertiary carbinols. The latter may be prepared by the condensation of acetylene with the desired vinyl ketone in the presence of an alkaline condensing agent. The prepartion and properties of certain of these compounds have been described and claimed in the copending patent applications Serial No. 286,012 filed on May 3, 1952, by Abraham Bavley et al.; Serial No. 296,744, filed July 1, 1952, by Abraham Bavley et al.; Serial No. 296,745, filed July 1, 1952, by Abraham Bavley et al.; and Serial No. 317,348, filed October 28, 1952, by Abraham Bavley et al.

The halogenation of the acetylenic carbinols is conducted by means of an alkaline, aqueous hypohalite solution. Since a number of the carbinols used as starting materials for the halogenation have limited solubility in water, it is generally necessary to use strong agitation to assure good contact of the two phases. A stable, preferably water-immiscible organic solvent, such as a hydrocarbon, may be used to dissolve the carbinol if desired. In general, these reactions are conducted by adding the unsaturated carbinol to the alkaline hypohalite solution at room temperature or at a somewhat lower temperature. It should be noted that the reactions generally take from a few minutes to several hours for completion. However, care must be exercised that the reaction is not allowed to proceed for too long a period. For instance, in the chlorination of certain of the carbinols by this procedure, if the reaction is allowed to proceed to a certain point, an explosive reaction may occur. However, if the reaction mixture is worked up at an early stage the products are obtained and no explosion ensues. At least about one and one-half moles of the hypohalite are generally used per molecular proportion of the unsaturated carbinol in order that a maximum yield of the valuable product may be obtained. A somewhat lower proportion of the halogenating agent may be used, but the yield of the product may also be lowered. Higher proportions are, of course, feasible, but there is usually no practical advantage in employing more than about three moles of the hypohalite per mole of carbinol. The aqueous solution should be approximately 2-Normal with respect to the alkaline agent used, although somewhat less or more concentrated solutions are acceptable. Various alkalis are useful to render the hypohalite solution alkaline. Alkali metal compounds are especially satisfactory, e. g. potassium hydroxide and lithium hydroxide. Although alkaline earth metal hydroxides also have some value, they are not preferred.

Certain other procedures may be used for the preparation of the new compounds of this invention. For instance, the haloacetylenic carbinal may be prepared by dehydrohalogenation of the corresponding 1,2-dihalovinyl compound. Other sources of hypohalite may be used for the halogenation reaction. For instance, an N-halo amide such as N-bromacetamide or N-bromsuccinimide may be added to aqueous alkali for this purpose.

The following is one preferred procedure which may be used for the preparation of the products of this invention. Potassium hypochlorite is used only for the purpose of illustration. A 25% potassium hydroxide solution is divided into two equal portions. One-half of this is diluted to 12½% solution. This is saturated with chlorine at 0° C. The remainder of the 25% potassium hydroxide is then added. The solution at this stage is approximately 0.55-Normal in potassium hypochlorite and 2-Normal in potassium hydroxide. Approximately one molecular proportion of the carbinol is added for each 1½ moles of potassium hypochlorite. The mixture is stirred vigorously. In the preparation of small batches of material, it has been found advisable to use a creased flask, that is, one having indentations in its wall, to assure turbulent agitation of the mixture. After a suitable reaction period, which will vary somewhat with the carbinol and the halogen used, the product is extracted with a suitable solvent, such as a lower ether, a lower halogenated hydrocarbon, or a hydrocarbon solvent; for example, benzene, toluene, pentane, hexane, etc. If a solvent is used in the reaction mixture, the phases are merely separated. The extract is washed with saturated brine to remove inorganic material, such as the halogenating agent. The extract is then dried over a dehydrating agent, such as anhydrous sodium sulfate, and the product may then be obtained by removal of the solvent. It is advisable to distill the material to obtain a product of high purity.

The colorless liquids or low-melting colorless solids thus produced are quite stable and they have been found to be good hypnotic agents. Application of materials to animals using a dosage of from about .05 to about .5 grams per kilogram of body weight induces marked hypnosis of the animals. This permits of treatment of the animal, for instance by therapeutic agents, which would not be possible without the use of a hypnotic agent.

These materials may be utilized in a variety of medicinal dosage forms, that is, they may be incorporated with various inert materials, e. g. solid diluents, oils, etc., or with other biologically active materials, in the form of capsules, elixirs, injectable solutions and so forth. For instance, solutions in propylene glycol are injectable. The materials for oral administration may be sweetened and flavored with various materials normally used for this purpose in the pharmaceutical industry.

Among the compounds which have been prepared and found especially valuable are the following—1-bromo-3,5,5-trimethylpent-1-yne-4-ene-3-ol, 1-bromo-3-methylpent-1-yne-4-ene-3-ol, 1-bromo-3-ethylpent-1-yne-4-ene-3-ol, and the corresponding chloro compounds.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

EXAMPLE I

1-bromo-3-ethylpent-1-yne-4-ene-3-ol

Bromine (12.5 ml. or 39 grams; 0.244 mole) was dissolved in an ice cold solution of 90 grams of potassium hydroxide in 400 ml. of water. This solution was flushed with nitrogen and stirred vigorously in a creased flask with 16.5 grams (0.15 mole) of 3-ethylpent-1-yne-4-ene-3-ol for one-half hour. The heavy oil produced was extracted with two portions of ether, and the extracts were washed with saturated sodium chloride solution and dried over anhydrous sodium sulfate. Removal of the ether and distillation of the residue gave 24.7 grams (87.0% yield) of a colorless liquid, boiling point 90–94° C. at 12 mm. Hg, $D_4^{20}=1.375$, $n_D^{25}=1.5000$.

Anal.—Calcd. for $C_7H_9OBr$: C, 44.47; H, 4.80. Found: C, 44.19; H, 4.81.

EXAMPLE II

1-bromo-3-methylpent-1-yne-4-ene-3-ol

This product was prepared as in Example I, but using sodium hydroxide in lieu of the potassium compound. From 14.4 grams (0.15 mole) of 3-methylpent-1-yne-4-ene-ol-3 there was obtained 20.7 grams (79.0% yield) of the colorless product, boiling point 76–80° C. at 8–9 mm. Hg, $D_4^{20}=1.450$; $n_D^{26}=1.5068$.

EXAMPLE III

1-chloro-3-ethylpent-1-yne-4-ene-3-ol

Six hundred milliliters of 12.5% by weight aqueous potassium hydroxide solution was saturated with chlorine at 0°. To this was added 600 ml. of 25% by weight aqueous potassium hydroxide solution, and the resulting solution was flushed with nitrogen. 3-ethylpent-1-yne-4-ene-3-ol (36.4 grams, 0.33 mole) was added and the mixture was stirred vigorously for one hour (precautions must be taken against a possible explosion). The product was extracted into ether, and the ether extracts were washed with saturated salt solution and dried over anhydrous sodium sulfate. Removal of ether and flash distillation of the residue gave 35.1 grams of colorless liquid, boiling point 55–69° C. at 14 mm. Hg. This was combined with 9.2 grams of similar material from another operation, and fractionated to recover 19.8 grams of unreacted 3-ethylpent-1-yne-4-ene-3-ol (boiling point 46–67° C. at 13 mm.) and to yield 21.1 grams of product, boiling point 67–68° C. at 12 mm. Hg, $D_4^{20}=1.050$; $n_D^{23.8}=1.5735$.

Anal.—Calcd. for $C_7H_9OCl$: C, 58.14; H, 6.27. Found: C, 58.35; H, 6.38.

EXAMPLE IV

1-bromo-3-n-butylpent-1-yne-4-ene-3-ol

This product was prepared from 16.58 grams (0.12 mole) of 3-n-butylpent-1-yne-4-ene-3-ol by the procedure of Example I. Yield 23.6 grams (90.6%) of colorless liquid, boiling point 49–50° C. at 0.14 mm. Hg, $D_4^{20}=1.250$; $n_D^{23.9}=1.4934$.

EXAMPLE V

1-bromo-3,4-dimethylpent-1-yne-4-ene-3-ol

Bromine (12.5 ml., 39 grams, 0.244 moles) was dissolved in an ice cold solution of 92 grams of potassium hydroxide in 400 ml. of water. Nitrogen was bubbled through the solution to remove all oxygen and this mixture was stirred vigorously in a creased flask with 16.5 grams of 3,4-dimethylpent-1-yne-4-ene-3-ol for about one-half hour. The oily product was extracted into ether and the extracts were washed with saturated sodium chloride and dried over anhydrous sodium sulfate. The ether was removed by distillation and the residual oil was distilled. The material was redistilled to obtain 10 grams of product boiling at 89°–90° C. under 15 mm. of pressure. This material had a density of $D^{23.5}=1.375$. It has a refractive index of $n_D^{23.5}=1.5051$.

Anal.—Calcd. for $C_7H_9OBr$: C, 44.47; H, 4.80. Found: C, 44.14; H, 4.85.

What is claimed is:

1. A compound having the following structure:

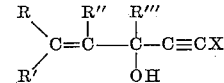

wherein R is chosen from the group which consists of hydrogen, methyl, and ethyl, R' is chosen from the group which consists of hydrogen, methyl and ethyl, R" is chosen from the group which consists of hydrogen and methyl, R'" is an alkyl group of up to five carbon atoms, and X is a halogen atom.

2. A product as claimed in claim 1 wherein X is chlorine.

3. A product as claimed in claim 1 wherein X is bromine.

4. A product as claimed in claim 1 wherein R, R' and R" are hydrogen, R'" is methyl and X is bromine.

5. 1-bromo-3-ethylpent-1-yne-4-ene-3-ol.

6. 1-chloro-3-ethylpent-1-yne-4-ene-3-ol.

7. A process for the preparation of a halogenated pent-yne-ene-ol, which comprises contacting a compound having the formula:

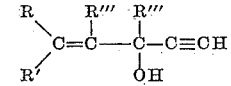

wherein R is chosen from the group which consists of hydrogen, methyl, and ethyl, R' is chosen from the group which consists of hydrogen, methyl and ethyl, R" is chosen from the group which consists of hydrogen and methyl, and R'" is an alkyl group of up to five carbon atoms, with an alkaline, aqueous hypohalite solution.

8. A process as claimed in claim 7 wherein the hypohalite solution is a solution of an alkali metal hypohalite in an aqueous alkali metal hydroxide solution.

9. A process for the preparation of 1-bromo-3-methylpent-1-yne-4-ene-3-ol, which comprises contacting 3-methylpent-1-yne-4-ene-3-ol with a solution of potassium hypobromite in an aqueous potassium hydroxide solution.

References Cited in the file of this patent

UNITED STATES PATENTS

| | | |
|---|---|---|
| 1,841,768 | Straus et al. | Jan. 19, 1932 |
| 2,425,201 | Oroshnik | Aug. 5, 1947 |
| 2,606,930 | Heilbron et al. | Aug. 12, 1952 |